US006996526B2

(12) United States Patent
Basson et al.

(10) Patent No.: US 6,996,526 B2
(45) Date of Patent: Feb. 7, 2006

(54) METHOD AND APPARATUS FOR TRANSCRIBING SPEECH WHEN A PLURALITY OF SPEAKERS ARE PARTICIPATING

(75) Inventors: Sara H. Basson, White Plains, NY (US); Peter Gustav Fairweather, Yorktown Heights, NY (US); Alexander Faisman, Ridgefield, CT (US); Dimitri Kanevsky, Ossining, NY (US); Jeffery Scott Sorensen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/040,406

(22) Filed: Jan. 2, 2002

(65) Prior Publication Data

US 2003/0125940 A1      Jul. 3, 2003

(51) Int. Cl.
  *G10L 15/00*      (2006.01)

(52) U.S. Cl. .................. 704/231; 704/232; 704/246

(58) Field of Classification Search ........ 704/255–256, 704/253, 257, 235, 243–244, 239, 251
See application file for complete search history.

(56) References Cited

U.S. PATENT DOCUMENTS

| | | | | |
|---|---|---|---|---|
| 6,122,613 | A  * | 9/2000 | Baker | 704/235 |
| 6,567,778 | B1 * | 5/2003 | Chao Chang et al. | 704/257 |
| 6,671,669 | B1 * | 12/2003 | Garudadri et al. | 704/255 |
| 6,766,295 | B1 * | 7/2004 | Murveit et al. | 704/243 |

* cited by examiner

*Primary Examiner*—W. R. Young
*Assistant Examiner*—Huyen X. Vo
(74) *Attorney, Agent, or Firm*—Ryan, Mason & Lewis, LLP

(57) ABSTRACT

A method and apparatus are disclosed for transcribing speech when a number of speakers are participating. A number of different speech recognition systems, each with a different speaker model, are executed in parallel. When the identity of all of the participating speakers is known and a speaker model is available for each participant, each speech recognition system employs a different speaker model suitable for a corresponding participant. Each speech recognition system decodes the speech and generates a corresponding confidence score. The decoded output having the highest confidence score is selected for presentation to a user. When all participating speakers are not known, or when there are too many participants to implement a unique speaker model for each participant, a speaker independent speech recognition system is employed together with a speaker specific speech recognition system. A controller selects between the decoded outputs of the speaker independent speech recognition system and the speaker specific speech recognition system based on information received from a speaker identification system and a speaker change detector.

9 Claims, 5 Drawing Sheets

METHOD AND APPARATUS FOR TRANSCRIBING SPEECH WHEN A PLURALITY OF SPEAKERS ARE PARTICIPATING

FIELD OF THE INVENTION

The present invention relates generally to speech recognition systems and, more particularly, to methods and apparatus for performing speech recognition when a number of speakers are participating.

BACKGROUND OF THE INVENTION

Speech recognition techniques translate an acoustic signal into a computer-readable format. Speech recognition systems have been used for various applications, including data entry applications that allow a user to dictate desired information to a computer device, security applications that restrict access to a particular device or secure facility, and speech-to-text transcription for information retrieval and other applications. A speech recognition system typically uses a particular speaker model that has been trained for the speech of a particular speaker.

Automatic speech recognition techniques can be used to transcribe a meeting with several participants. Since a given speech recognition system uses only one speaker model at a time, however, they speaker model must be changed each time there is a corresponding change in speaker. Generally, the speech recognition system must therefore automatically detect a change in speaker, obtain the identity of the speaker and then download the appropriate model for the identified speaker. During this transitional speaker process, conventional speech recognition systems are unable to transcribe the speech at all, or do so with the wrong speaker model providing generally poor results.

A need therefore exists for an improved method and apparatus for transcribing the speech of a number of participants. In addition, a need exists for a method and apparatus for transcribing the speech of a number of participants that does not provide interrupted transcription when there is a speaker change.

SUMMARY OF THE INVENTION

Generally, a method and apparatus are disclosed for transcribing speech when a number of speakers are participating. According to one aspect of the invention, a number of different speech recognition systems, each with a different speaker model, are executed in parallel. When the identity of all of the participating speakers is known and a speaker model is available for each participant, each speech recognition system employs a different speaker model suitable for a corresponding participant. Each speech recognition system decodes the speech and generates a corresponding confidence score. The decoded output is selected, for example, on the basis of the confidence score, for presentation to a user.

When there are too many participants in a meeting to implement a unique speaker model for each participant, or when the identity of a speaker is unknown, a speaker independent speech recognition system is employed together with a speaker specific speech recognition system. In addition, a speaker identification system is employed to identify an unknown speaker and a speaker change detector monitors the speech for a change in speaker. The speaker independent model is used whenever the identity of the current speaker is unknown.

A controller selects between the decoded outputs of the speaker independent speech recognition system and the speaker specific speech recognition system, as appropriate based on the information received from the speaker identification system and the speaker change detector. In particular, the controller initially selects the decoded output of the speaker independent speech recognition system for presentation to the user, until the identity of the speaker is known. Once the identity of the speaker is known, the controller selects the decoded output of the speaker specific speech recognition system for presentation to the user, until there is a speaker change (and the speaker independent speech recognition system is again selected until the identity of the speaker is determined and the appropriate speaker model is loaded).

A more complete understanding of the present invention, as well as further features and advantages of the present invention, will be obtained by reference to the following detailed description and drawings.

DETAILED DESCRIPTION OF PREFERRED EMBODIMENTS

Figure 1:
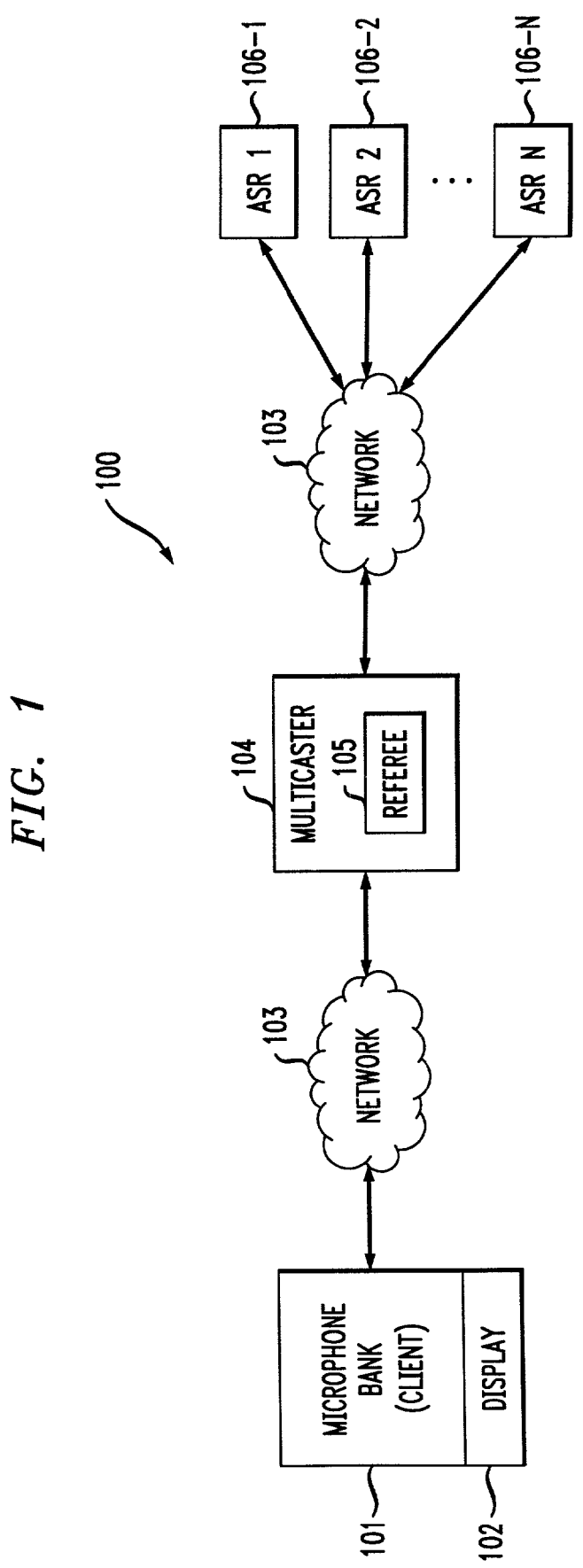
FIG. 1 is a schematic block diagram of a speech recognition system in accordance with a first embodiment of the present invention.

The present invention provides a technique for transcribing speech when a number of speakers are participating. FIG. 1 is a schematic block diagram of a speech recognition system 100 in accordance with a first embodiment of the present invention, where the identity of the participating speakers is known and a speaker model is available for each participant. As shown in FIG. 1, the speech recognition system 100 includes a client 101 having a microphone bank that may include one or more microphones for capturing the speech of several people (not shown). In addition, there is a display 102 associated with the client 101 for displaying the decoded speech output of the speech recognition system 100, for example, to a participant who may be hearing impaired.

The audio signals captured by the microphone bank 101 are provided to a multicaster 104 over a network connection 103. The network 103 may be any wired or wireless network environment, or a combination thereof, for communicating information, including the Internet or a Bluetooth™ wireless network. According to one aspect of the present invention, the multicaster 104 transmits the captured audio signals (voice data) to a plurality of automatic speech recognition (ASR) systems 106-1 through 106-N, hereinafter, collectively referred to as automatic speech recognition systems 106. The automatic speech recognition systems 106 may execute on one or more different servers.

As discussed further below in conjunction with FIG. 7, the decoded output of each automatic speech recognition system 106 is packaged with each respective confidence score and is provided back to the multicaster 104. The multicaster 104 includes a referee 105 that selects the word that seems most appropriate, based on the confidence score, in a manner discussed further below. The referee 105 returns the selected word to the client 101 for presentation to the user on the display 102.

Although the client 101, multicaster 104 and automatic speech recognition systems 106 are shown in a distributed network environment in FIG. 1, one or more of these entities can execute on the same processor, as would be apparent to a person of ordinary skill in the art. Generally, the embodiment shown in FIG. 1 supports the translation of speech-to-text with multiple individuals with known identities. In such an embodiment, the microphone bank 101 can include one microphone dedicated for each speaker, or a number of speakers can share a microphone. If there is a shared microphone, it must be capable of capturing the voice data of different people from different distances and positioned properly. In addition, each automatic speech recognition system 106 is loaded with a speaker model corresponding to a particular known speaker. Generally, before a given presentation, the speech recognition system 100 can be activated with the speaker models of each participant. In this manner, the automatic speech recognition system 106 associated with a given speaker will tend to have the highest confidence score (relative to the other automatic speech recognition systems 106) when the associated speaker is speaking.

Figure 2:
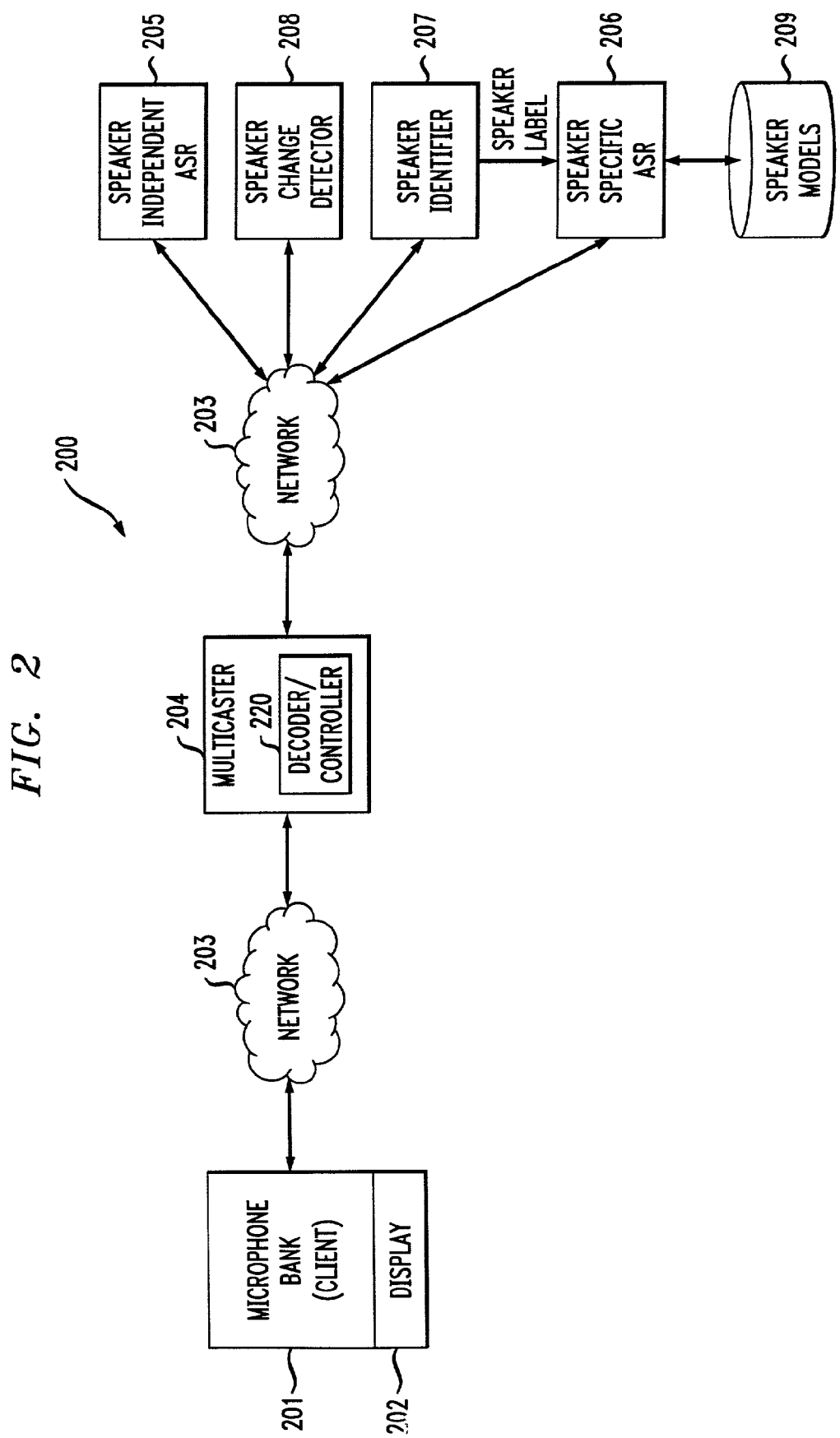
FIG. 2 is a schematic block diagram of a speech recognition system in accordance with a second embodiment of the present invention.

FIG. 2 is a schematic block diagram of a speech recognition system 200 in accordance with a second embodiment of the present invention. The embodiment shown in FIG. 2 is particularly useful when there are too many participants in a meeting to implement a unique speaker model for each participant, or when the identity of a speaker at a meeting is unknown. As shown in FIG. 2, the speech recognition system 200 includes a client 201 having a microphone bank that may include one or more microphones for capturing the speech of several people (not shown). In addition, there is a display 202 associated with the client 201 for displaying the decoded speech output of the speech recognition system 200, for example, to a participant who may be hearing impaired.

The audio signals captured by the microphone bank 201 are provided to a multicaster 204 over a network connection 203. The network 203 may be any wired or wireless network environment, or a combination thereof, for communicating information, including the Internet or a Bluetooth™ wireless network. The multicaster 204 includes a controller 220, discussed further below in conjunction with FIG. 4. According to one aspect of the present invention, the multicaster 204 initially transmits the captured audio signals (voice data) to a speaker independent automatic speech recognition system 205 that decodes the audio data and returns the decoded data back to the controller 220.

In addition, the multicaster 204 also transmits the captured audio signals (voice data) to a speaker identification system 207 if the speaker has not yet been identified. The speaker identification system 207 identifies the speaker and provides a speaker identifier to a speaker specific ASR 206, which is used by the speaker specific ASR 206 to access the appropriate speaker model from a database 209. In one implementation, the speaker identification system 207 may be implemented by providing a graphical user interface (GUI) to the user on the display 202 with a list of the potential speakers. The user can select the appropriate individual using the GUI each time there is a speaker change and thereby manually indicate the appropriate speaker model 209 to be employed.

The manual speaker indication can also be employed by a user if the automatically assigned speaker label is incorrect. In this manner, the speech recognition system 200 can adapt the speaker identification process based on the manual correction. For example, the speech recognition system 200 can add a small penalty to the likelihood formula that computes the confidence score if the user indicated a different speaker manually.

There are a number of known techniques for identifying speakers in an audio stream, including U.S. patent application Ser. No. 09/434,604, filed Nov. 5, 1999, U.S. patent application Ser. No. 09/345,237, filed Jun. 30, 1999, and U.S. patent application Ser. No. 09/288,724, filed Apr. 9, 1999, each assigned to the assignee of the present invention and incorporated by reference here. U.S. patent application Ser. No. 09/345,237, for example, discloses a method and apparatus for automatically transcribing audio information from an audio source while concurrently identifying speakers in real-time, using an existing enrolled speaker database.

Once the identity of the speaker is known, the speaker specific ASR 206 decodes the speech using the proper model 209 and provides the decoded speech output back to the controller 220. Likewise, once the identity of the speaker is known, the controller 220 uses the decoded output from the speaker specific ASR 206 when sending data to the client 201 for presentation to the user using the display 202.

Meanwhile, the multicaster 204 is transmitting the captured audio signals (voice data) to a speaker change detector 208 that monitors the speech for a change in speaker, in a known manner. When the speaker change detector 208 detects a new speaker, it notifies the controller 220. Thereafter, the controller 220 again transmits the voice data to the speaker independent ASR 205, if necessary, and begins providing the decoded output from the speaker independent ASR 205 to the client 201 for presentation to the user.

Figure 3:
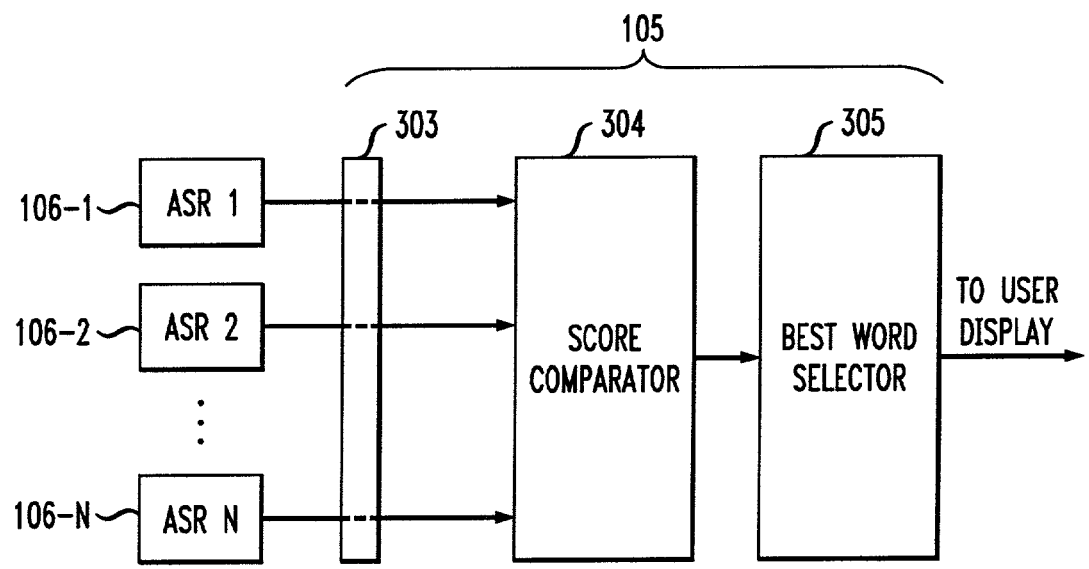
FIG. 3 is a schematic block diagram of the referee of FIG. 1 in further detail.

FIG. 3 is a schematic block diagram of the referee 105 of FIG. 1 in further detail. As shown in FIG. 3, the referee 105 receives data from each of the automatic speech recognition systems 106-1 through 106-N. The data from each of the automatic speech recognition systems 106-1 through 106-N includes a selected word and a corresponding confidence score. For a discussion of the calculation of confidence scores in a speech recognition system, see, for example, Lidia Mangu, Eric Brill and Andreas Stolcke, "Finding Consensus in Speech Recognition: Word Error Minimization and Other Applications Of Confusion Networks," Computer Speech and Language, 14, 373–400 (2000), incorporated by reference herein.

Module 303 time aligns the data received from each of the automatic speech recognition systems 106-1 through 106-N, that may have recorded the data at different time segments. Therefore, it is necessary to position each set of words, phonemes, and phrases according to their respective time segment. There are several known methods for time alignment. One suitable technique is a Viterbi time alignment technique described, for example, in F. Jelinek, "Statistical Methods for Speech Recognition," MIT Press (1998). In one variation, words may be compared that are closely matched in reference with their time.

Once the words are aligned, a score comparator 304 compares the confidence scores of each suggested word. A best word selector 305 then selects the best decoded word, based on the confidence score. The selected word is then provided to the client 101 for presentation to the user.

In a further variation, several decoded outputs from the automatic speech recognition systems 106-1 through 106-N can be presented to the user with some indication of the corresponding confidence score. For example, the decoded outputs can be ranked according to the confidence score and mapped to some color scheme or font scheme that indicates the corresponding confidence score. In yet another variation of the display option, the decoded output can be printed as a string of words if the confidence score exceeds a certain threshold and as phones or syllables if the confidence score is below a certain threshold. In addition, the decoded output can be printed as a string of words for the decoded output having the highest confidence score and as phones or syllables for all other decoded outputs. The best word selector 305 can optionally employ one or more rules to select an alternate output under certain conditions. For example, an acoustic segment may have a higher confidence score for a given speaker for most words, but some isolated words in the segment have a higher confidence score for a second speaker. Thus, the second speaker may have uttered the isolated words during the speech of the first speaker (e.g., the second speaker may have said "yes" or "no" while the first speaker spoke a long phrase) or the system improperly assigned a higher confidence score to the second speaker model despite the fact that the actual speaker was the first speaker. The best word selector 305 can overcome this difficulty using a rule that if the system assigns a higher confidence score to "rare" words to the second speaker model and that these rare words are inserted in a string of words that have higher confidence score for the first speaker model, then these rare words can be represented phonetically (e.g., as phones) and not as a textual words.

Figure 4:
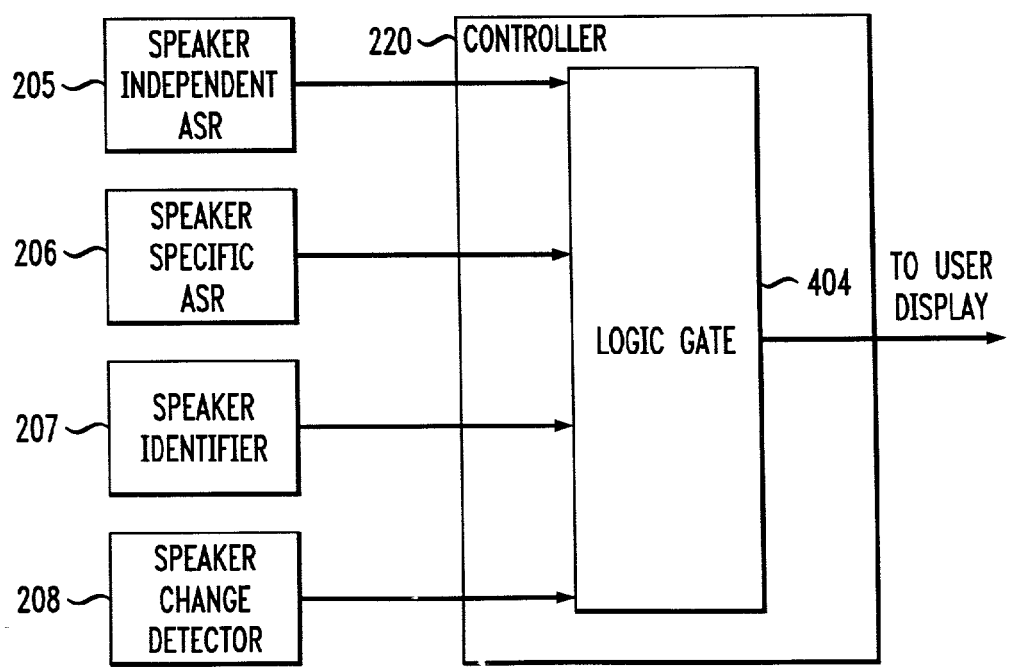
FIG. 4 is a schematic block diagram of the controller of FIG. 2 in further detail.

FIG. 4 is a schematic block diagram of the controller 220 of FIG. 2 in further detail. As shown in FIG. 4, the controller 220 receives data from the speaker independent ASR 205, speaker specific ASR 206, speaker identification system 207 and speaker change detector 208. When the speaker identification system 207 identifies a new speaker, the speaker label can be provided directly to the speaker specific ASR 206 or by means of the controller 220. As indicated above, the speaker specific ASR 206 uses the speaker label to obtain the appropriate speaker model from a database 209. Likewise, when the speaker change detector 208 detects a change in speaker, a notification can be provided directly to the speaker identification system 207, or by means of the controller 220.

As indicated above, the controller 220 selects between the decoded outputs of the speaker independent ASR 205 and the speaker specific ASR 206, as appropriate based on the information received from the speaker identification system 207 and the speaker change detector 208. In particular, the controller 220 includes a logic gate 404 that initially selects the decoded output of the speaker independent ASR 205 for presentation to the user using the display 202, until the identity of the speaker is known. Once the identity of the speaker is known, the logic gate 404 selects the decoded output of the speaker specific ASR 206 for presentation to the user using the display 202, until there is a speaker change (and the speaker independent ASR 205 is again selected until the identity of the speaker is determined and the appropriate speaker model is loaded into the speaker specific ASR 206).

Figure 5:
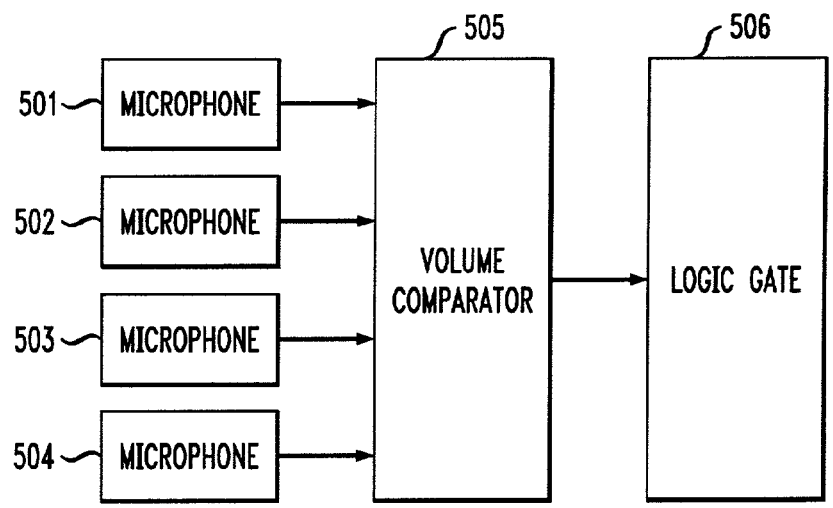
FIG. 5 illustrates an exemplary implementation of the microphone banks of FIGS. 1 and 2.

FIG. 5 illustrates an exemplary implementation of the microphone banks of FIGS. 1 and 2. In the illustrative embodiment of FIG. 5, it is assumed that each speaker has a dedicated microphone, such as the microphones 501–504. When each speaker has a dedicated microphone, it is possible that the voice of a given speaker can be captured by several microphones 501–504, at different volume levels relative to the distance between the speaker and each microphone. As shown in FIG. 5, a volume comparator 505 compares the volume of sound data received from each of the microphones 501–504. A logic gate 506 selects the signal associated with the microphone having the highest volume. In a further variation, each microphone 501–504 can tag the voice data that is captured by the microphone. In this manner, the logic gate 506 can evaluate the tags and route the audio signal to the appropriate ASR 106 corresponding to the speaker associated with the microphone. In such an embodiment, each microphone can be wired directly to the corresponding ASR 106.

Figure 6:
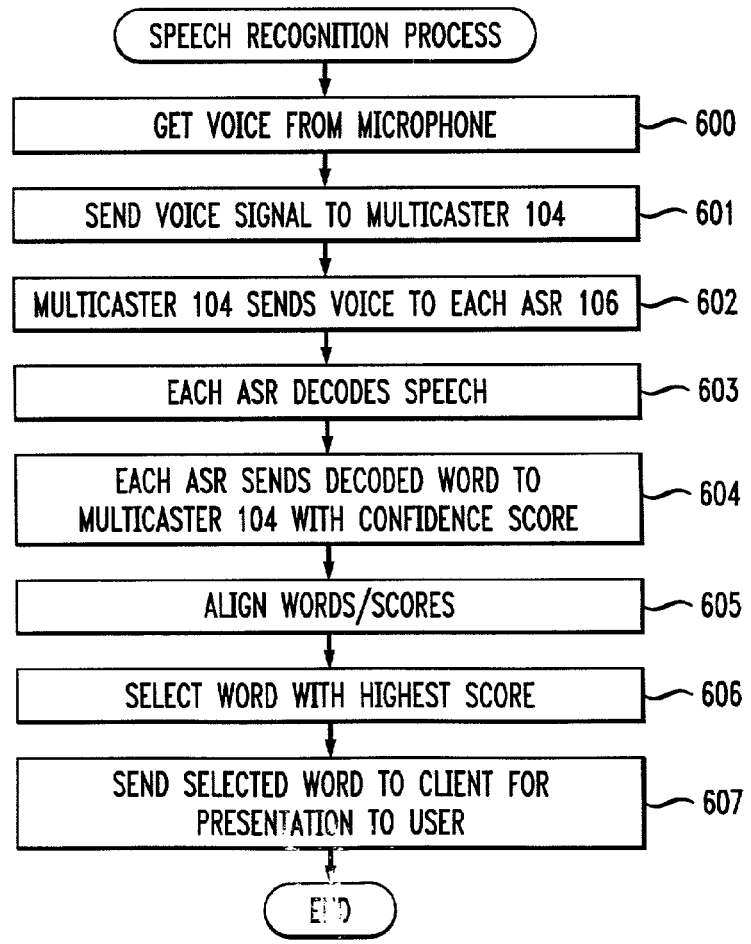
FIG. 6 is a flow chart describing the methodology for the embodiment shown in FIG. 1.

FIG. 6 is a flow chart describing the methodology for the embodiment shown in FIG. 1. As shown in FIG. 6, the speech recognition system 100 initially obtains a voice signal from a microphone 101 during step 600. The voice signal is provided to the multicaster 104 during step 601. The multicaster 104 then provides the voice signal to each of the automatic speech recognition systems 106 during step 602. Each automatic speech recognition system 106 then decodes the voice signal during step 603 and sends the decoded data with the corresponding confidence score to the referee 105 during step 604.

As discussed above in conjunction with FIG. 3, the referee 105 aligns the words during step 605 and selects the word with the highest confidence score during step 606. The selected word is sent to the client 101 during step 607 for presentation to the user before program control terminates.

Figure 7:
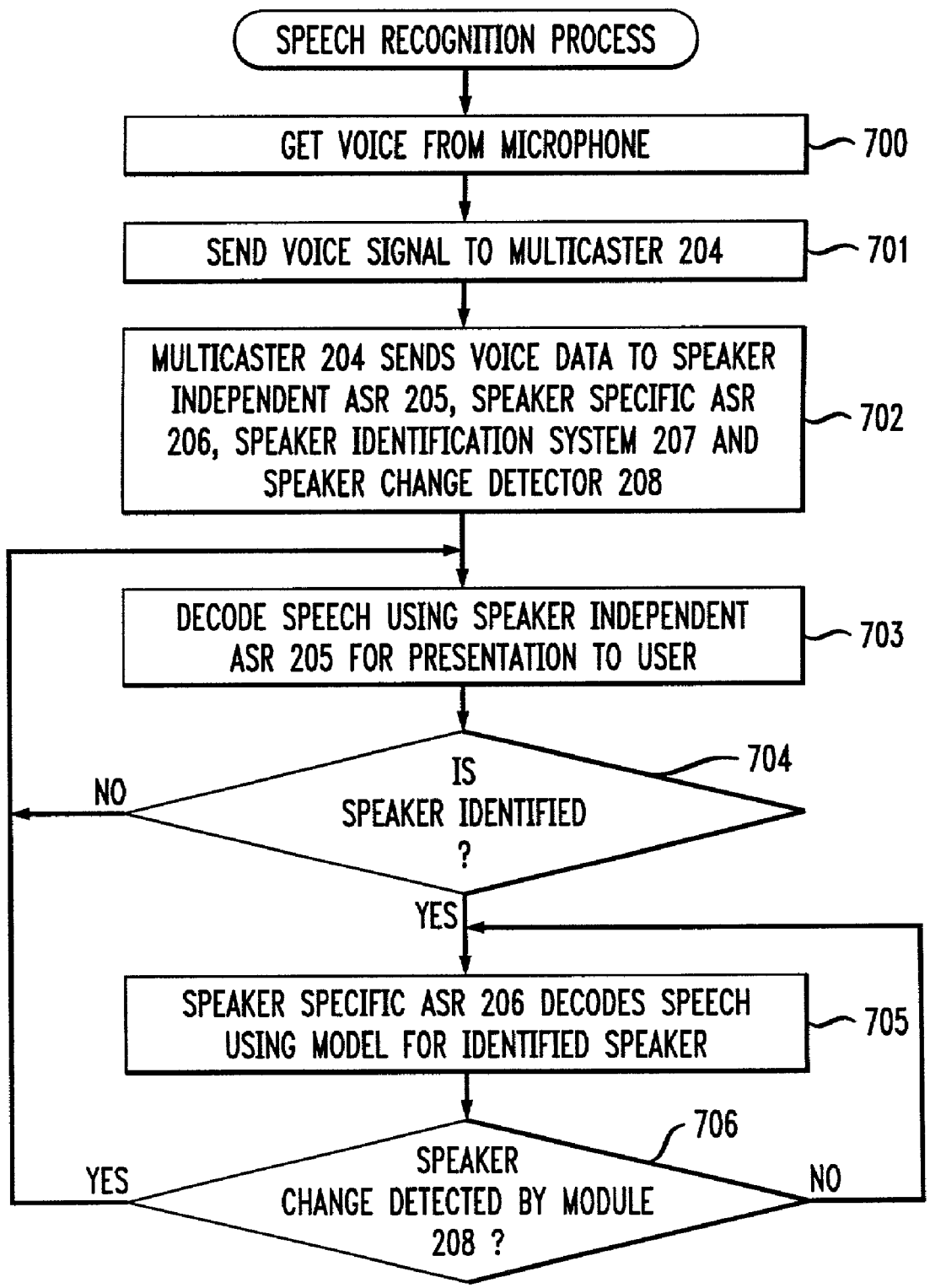
FIG. 7 is a flow chart describing the methodology for the embodiment shown in FIG. 2.

FIG. 7 is a flow chart describing the methodology for the embodiment shown in FIG. 2. As shown in FIG. 7, the speech recognition system 200 initially obtains a voice signal from a microphone 101 during step 70. The voice signal is provided to the multicaster 204 during step 701. The multicaster 204 then provides the voice signal to each of the speaker independent ASR 205, speaker specific ASR 206, speaker identification system 207 and speaker change detector 208 in parallel during step 702. Initially, the speaker independent ASR 205 decodes the speech during step 703 for presentation to the user, until it is determined during step 704 that the speaker has been identified by the speaker identification system 207.

Thereafter, the speaker specific ASR 206 decodes the speech during step 705 for presentation to the user, using the appropriate speaker model 209 for the identified speaker, until it is determined during step 706 that a speaker change has been detected by the speaker change detector 208. Once a speaker change is detected during step 706, program control returns to step 703 where the speaker independent ASR 205 again decodes the speech for presentation to the user, until it is determined during step 704 that the new speaker has been identified by the speaker identification system 207.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It is to be understood that the embodiments and variations shown and described herein are merely illustrative of the principles of this invention and that various modifications may be implemented by those skilled in the art without departing from the scope and spirit of the invention.

What is claimed is:

1. A method for transcribing speech of a plurality of speakers, comprising:
    providing said speech to a plurality of speech decoders, each of said decoders using a speaker model corresponding to a different one of said speakers and generating a confidence score for each decoded output;
    selecting a decoded output based on said confidence score; and
    presenting said decoded output as a string of words for the decoded output having the highest confidence score and as phones or syllables for all other decoded outputs.

2. The method of claim 1, further comprising the step of aligning each of said decoded outputs in time.

3. The method of claim 1, wherein one or more of said speech decoders are on a remote server.

4. The method of claim 1, further comprising the step of presenting said selected decoded output to a user.

5. The method of claim 1, further comprising the step of manually selecting an alternate decoded output if said assigned output is incorrect.

6. The method of claim 5, further comprising the step of adapting said selecting step based on said manual selection.

7. The method of claim 1, further comprising the step of presenting several decoded outputs to a user with an indication of said corresponding confidence score.

8. The method of claim 1, further comprising the step of presenting said decoded output as a string of words if said corresponding confidence score exceeds a certain threshold and as a string of phones if said corresponding confidence score is below a certain threshold.

9. The method of claim 1, wherein said selecting step further comprises the step of determining if a decoded output includes an isolated word from a second speaker in a string of words from a first speaker.

* * * * *